United States Patent
Mukhopadhyay

(10) Patent No.: US 10,609,001 B2
(45) Date of Patent: Mar. 31, 2020

(54) USING CRYPTOGRAPHY AND APPLICATION GATEWAY TO ELIMINATE MALICIOUS DATA ACCESS AND DATA EXFILTRATION

(71) Applicant: Synergy Business Innovation & Solution, Inc., Reston, VA (US)

(72) Inventor: Chandan Mukhopadhyay, Annandale, VA (US)

(73) Assignee: SYNERGY BUSINESS INNOVATION & SOLUTION, INC., Reston, VA (US)

( * ) Notice: Subject to any disclaimer, the term of this patent is extended or adjusted under 35 U.S.C. 154(b) by 215 days.

(21) Appl. No.: 15/909,740

(22) Filed: Mar. 1, 2018

(65) Prior Publication Data

US 2020/0028823 A1    Jan. 23, 2020

(51) Int. Cl.
| | |
|---|---|
| *H04L 29/06* | (2006.01) |
| *G06F 21/33* | (2013.01) |
| *H04L 12/66* | (2006.01) |
| *G06F 21/60* | (2013.01) |

(52) U.S. Cl.
CPC .......... *H04L 63/0428* (2013.01); *G06F 21/33* (2013.01); *G06F 21/602* (2013.01); *H04L 12/66* (2013.01); *H04L 63/0823* (2013.01)

(58) Field of Classification Search
CPC . H04L 63/0428; H04L 12/66; H04L 63/0823; G06F 21/33; G06F 21/602
See application file for complete search history.

(56) References Cited

U.S. PATENT DOCUMENTS

| | | | |
|---|---|---|---|
| 7,860,243 B2 | 12/2010 | Zheng | |
| 9,286,491 B2* | 3/2016 | Roth | .................. G06F 21/6254 |
| 9,536,103 B2* | 1/2017 | Redberg | ................ G06F 21/602 |
| 9,819,656 B2 | 11/2017 | Carlson | |
| 2009/0185685 A1 | 7/2009 | DeRobertis | |
| 2013/0246535 A1* | 9/2013 | Yadava | ................ G06Q 10/107 709/206 |
| 2014/0195798 A1* | 7/2014 | Brugger | .............. H04L 63/0227 713/154 |
| 2017/0279656 A1 | 9/2017 | Vela Nava | |

* cited by examiner

*Primary Examiner* — Hee K Song
(74) *Attorney, Agent, or Firm* — Loza & Loza, LLP; Michael I. Angert

(57) ABSTRACT

A system and method that prevents data access and data exfiltration is disclosed. The system includes a communication interface configured to receive and send encrypted and non-encrypted data, a secure storage device that resides on a gateway the storage device stores a plurality of pre-configured encryption policies and a processing circuit coupled to the storage device and the communication interface. The processing circuit configured to identify confidential data elements in a message payload received at the gateway through the communication interface, apply the encryption policies to each identified confidential data element in the message payload, receive a collection of Group Keys from a key store, encrypt each identified confidential data element in the message payload based on the encryption policies and the Group Keys and store the encrypted identified confidential data elements in a remotely located data storage device accessible through the communication interface.

17 Claims, 5 Drawing Sheets

*Overview of Data Encryption Flow*

USING CRYPTOGRAPHY AND APPLICATION GATEWAY TO ELIMINATE MALICIOUS DATA ACCESS AND DATA EXFILTRATION

BACKGROUND

Field

Various features relate to using cryptography and an application-level gateway (Application Gateway) to selectively encrypt confidential data. The approach significantly reduces the risks of insider threat and exfiltration on confidential data.

Background

Enterprises often need to store and exchange confidential information for various business requirements. Most of the modern enterprises use computer based Information Systems using electronic media to store and exchange confidential data. However, such confidential data storage and exchange using electronic media creates the risk of data breach, which may have severe consequences to a business. Cryptography techniques are often used to secure storage and communication of confidential information over electronic media.

Cryptography is practice and study of encrypting messages in a particular form so that only those authorized to receive the message be are able to read it. For electronic communication, a confidential message is scrambled and transformed into a secret message digest using a cryptographic key which may be transformed back into its original form with a cryptographic key.

Thus, most Information Systems (IS) have created a way to protect data in transit by implementing Transport Layer Security (TLS), that is, the protocol that provides privacy and data integrity between two communicating applications. However, securing data at rest is still a challenging issue. Complete disk encryption is often used as a solution which effectively protects the data in the event the disk is stolen. However, there is no reliable way to protect data from an insider threat, which is arguably the most common reason for data breaches today.

Briefly, Most Information Systems use a Relational Database Management System (RDBMS) to store business data. RDBMS refers to a database that stores data in a structured format, using rows and columns. This makes it easy to locate and access specific values within the database. It is "relational" because the values within each table are related to each other. Data is often distributed across several tables. User-centric Information Systems serving web pages in a browser over HTTP or HTTPS often use a combination of web and application servers to deliver data stored in a RDBMS (database). Application servers typically connect to the database using the privileges of a system user with a substantially high level of permission to read, update, and delete data from all tables in the database. While this is required for proper functioning of the application, it creates significant security vulnerability.

Role-based access control is often implemented using Row Level Security (RLS) in the database, which can restrict data access to general users based on a user's identity, role, or execution context. RLS generally uses a WHERE clause expansion mechanism by identifying a user logging in and then comparing their identity with some identifying data elements for every row in the database; however, the application and/or database administrators can very easily circumvent this restriction and access all data stored in the database by querying the database using the system user privilege. More sophisticated system administrators can create an application using the application server's connection to the database, which use system user privileges to run any SQL query against the database to access any information. Due to this reason, it is almost impossible to prevent a properly credentialed system administrator (Sys Admin) or a Database Administrator (DBA) from becoming a potential insider threat. Similarly, it is very difficult to prevent a situation where some general user with malicious intent gains elevated privilege by social engineering or other means and gains access to confidential data which she/he is not permitted to access.

Most of the insider threat prevention and exfiltration detection mechanisms are implemented by raising alerts based on network data usage patterns. These alerts are often triggered after the data is breached and/or exfiltrated. In some cases, implementation of data access policies and user education are presented as preventive measures, but these measures don't stop users with malicious intent from improper data access. Also, malicious data access by Sys Admins and Database Administrator (DBA) cannot be reliably identified as they often need to access a high volume of data to perform their work.

Finally, though the connection between users and Application Server is often done over HTTPS (or TLS), intra system communication happens over non-encrypted sockets. That makes the data vulnerable in-motion as malicious network users can use a network sniffer to capture the data packets and reconstruct message digest.

Therefore, there is a need to improve the confidentiality of data accessible by an insider attack or other malicious entity.

SUMMARY

This invention describes and claims a non-obvious, reliable, useful, and practical approach to prevent malicious data access using cryptography to selectively encrypt and decrypt confidential data. The invention uses a combination of symmetric and asymmetrical (PKI) cryptography to implement a comprehensive data protection mechanism. The approach utilizes an Application Gateway to inspect the payload from an HTTP message body and identify and encrypt confidential data using policies configured in the Application Gateway.

In one aspect, a system for data protection is disclosed. The system includes a communication interface configured to receive and send encrypted and non-encrypted data, a secure storage device that resides on a gateway and stores a plurality of pre-configured encryption policies, a key store containing a set of Group Keys, and a processing circuit coupled to the storage device and the communication interface. The processing circuit is configured to identify confidential data elements in a message payload received at the gateway through the communication interface, apply the encryption policies to each identified confidential data element in the message payload, retrieve a collection of Group Keys from a key store, encrypt each identified confidential data element in the message payload based on the encryption policies, using the Group Keys and store the encrypted identified confidential data elements in a remotely located data storage device accessible through the communication interface.

In another aspect, a method implemented on a gateway for data protection is disclosed. The method includes identifying confidential data elements in a message payload received at a gateway, applying a collection of encryption policies stored on the gateway to each identified confidential data element in the message payload and receiving a collection of Group Keys related to group affiliations of users from a key store. The method further includes encrypting each identified confidential data element in the message payload based on the encryption policies and the Group Keys and storing the encrypted identified confidential data elements in a remotely located data storage device accessible through the gateway.

In another aspect, a method implemented at a gateway for decrypting protected data is disclosed. The method includes receiving a request from a user device at the gateway for confidential data from a data store in communication with the gateway. The method further includes, authenticating a user accessing the user device based on a login authentication of the user and identifying a group affiliation based on the login authentication of the user. The method further includes retrieving a collection of Group Keys based on the group affiliation and storing the Group Keys in a secure storage device, retrieving the confidential data including encrypted confidential data elements from the data store, decrypting the encrypted confidential data elements based on the Group Keys, and delivering the confidential data including the decrypted confidential data elements to the user device.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Several novel features pertain to encrypting data for storage in storage devices to preserve the confidentiality of the data. The novel features may be applicable in a wide range of systems, apparatus and devices and to achieve a variety of goals.

The systems and methods discussed herein represent a new application design approach using cryptography and an application-level gateway (Application Gateway) to selectively encrypt confidential data. The approach significantly reduces the risks of insider threats and exfiltration on confidential data. Implementing the technical approach described below in conjunction with a policy for separation of duties can eliminate the insider threat and exfiltration of confidential data.

A variety of users may have access to internal databases but each user has different functions and requires different access to the stored data. However, certain user accounts, by virtue of their administrative role or to satisfy the access requirements of certain applications using the database, are given access to all data stored in a database. Allowing all such users access to the data stored in an internal database creates vulnerabilities to both outside and inside attacks of data theft.

In one aspect, users are separated into different permission categories or group affiliations and the system provides limitations to elements of the stored data and allowing access to those limited elements based on the identified permissions.

In another aspect, each identified data element is encrypted and decrypted based on defined policies. Access to the identified encrypted elements and decrypting the elements for the access is based on the permissions and roles of the requesting user. In this manner, threats to the data, particularly where insider threats are most concerning can be effectively eliminated.

Exemplary System Hardware Environment

Figure 1:
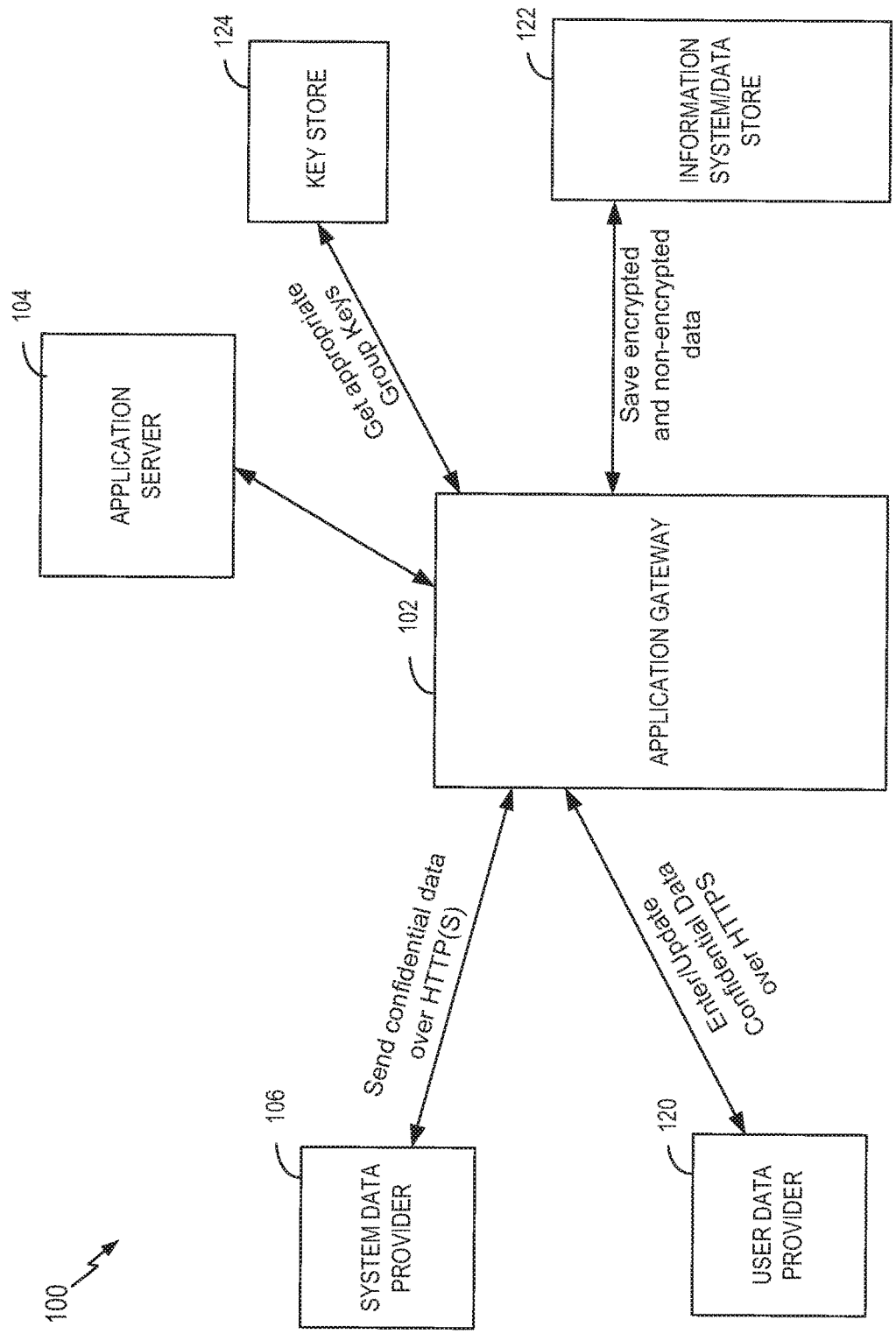
FIG. 1 illustrates a block diagram of an Application Gateway encryption process in accordance with an illustrative example.

FIG. 1 illustrates a system 100 of exemplary components in accordance with one example where various novel features described below may be exploited. The system 100 includes an Application Gateway 102, which resides between an Application Server 104 and a user's browser at a User Data Provider device 120. Data Providers are individuals or systems that provide or generate data at the User Data Provider device 120 that may include confidential data or update the same and received at the Application Gateway 102 over an HTTPS protocol message payload. Confidential data may further be received at the Application Gateway 102 from an External IT provider or a System Data Provider 106. The confidential data from System Data Provider 106 is also provided over an HTTPS protocol communication to be processed at the Application Gateway 102.

Individual users may log in to the system 100 using basic authentication such as an authorized user name and password and then use TLS to establish a secure transmission channel, as is commonly understood in the art to submit data. Examples of data provided by humans are Personally Identifiable Information (PII) and Protected Health Information (PHI) data. Data providers do not necessarily need to use multi-factor authentication or provide a digital certificate such as an X.509 public key infrastructure standard (PKI) certificate to authenticate with the system 100. For system to system communication, the User Data Provider 120 can send data over HTTPS or Secure File Transfer Protocol (FTPS). Thus, it is assumed that data providers will send unencrypted data over a secured/encrypted channel.

Communications containing confidential data from the User Data Provider 120 to the Application Server 104 are routed through the Application Gateway 102 to implement selective encryption and decryption of confidential data as will be further explained in accordance with embodiments presented herein. Communication not containing confidential data is not required to be routed through the Application Gateway 102.

Figure 2:
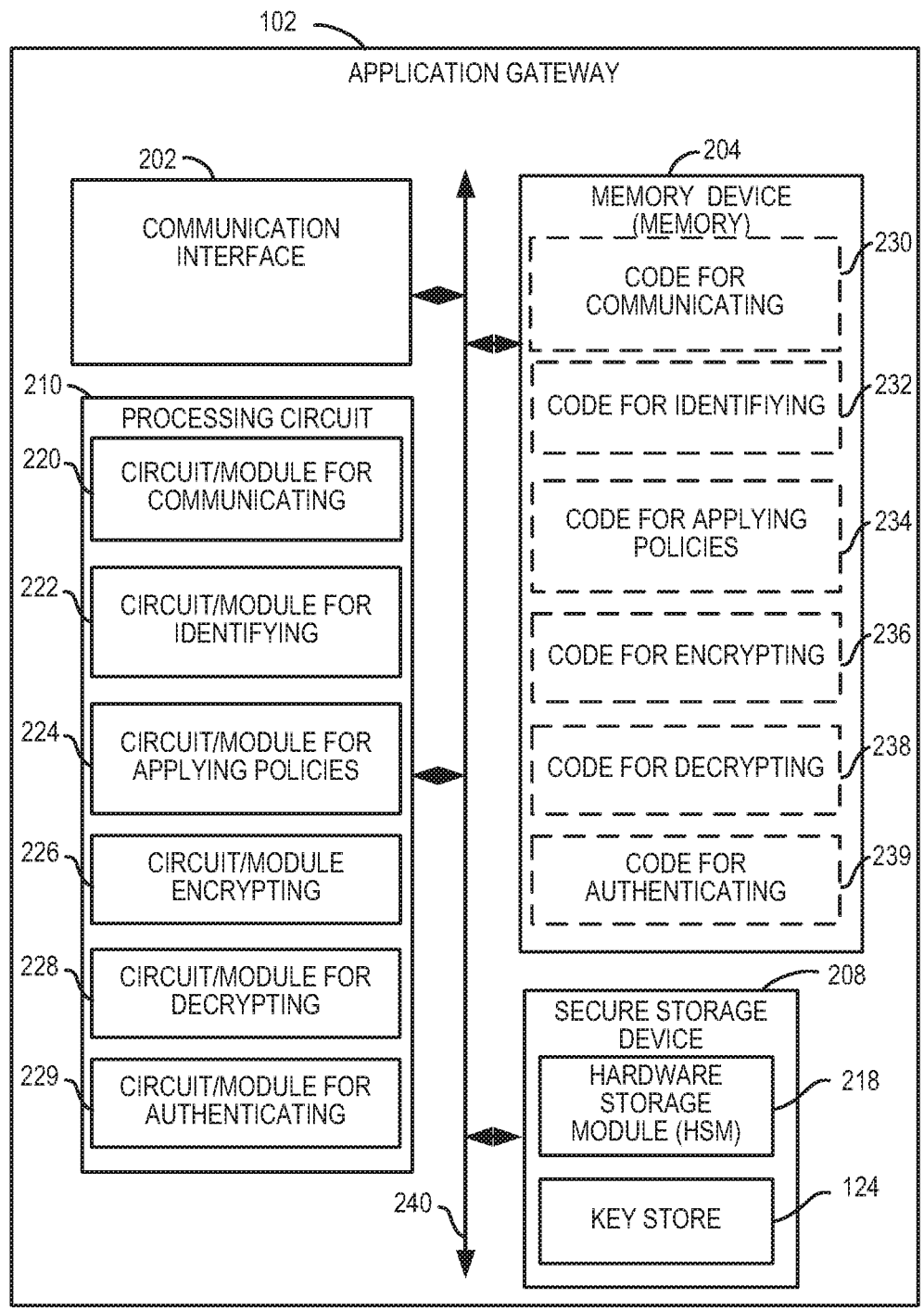
FIG. 2 illustrates an exemplary block diagram of components of an Application Gateway in accordance with an illustrative example.

The Application Gateway 102 provides or integrates and communicates with a Key Store 124 which may be located remotely from the Application Gateway 102 as is illustrated in the exemplary embodiment of FIG. 1 or, preferably, integrated with the Application Gateway 102 as is shown in an exemplary embodiment of FIG. 2, to store all cryptographic Group Keys. In either embodiment, the Key Store 124 is only accessible by the Application Gateway 102. It also stores all other keys/certificates used by other providers accessing the system 100 and participating in the data exchange within a trust environment.

The Application Gateway 102 communicates data with a remotely located data storage device such as an Information System Data Store 122. The confidential data received at the Application Gateway 102 may be stored in the Information System Data Store 122. The message payload received at the Application Gateway 102 may include data that is not confidential data and will also be stored on the Data Store 122 as included in the message payload.

FIG. 2 illustrates an overall exemplary components of the Application Gateway 102 by which the methods described below for secure data access may be implemented. In accordance with various aspects of the disclosure, an element, or any portion of an element, or any combination of elements may be implemented with the processing system associated with the Application Gateway 102 that includes one or more processing circuits 210 of FIG. 2. Processing circuit 210, as utilized in the Application Gateway 102, may be used to implement any one or more of the processes described discussed below. In particular, processing circuit 210 may be configured to: identify confidential data elements in a message payload received at the Application Gateway and to apply the encryption policies to each identified confidential data element in the message payload, encrypt the identified confidential data elements based on the Group Keys and the encryption policies and store identified confidential data elements in the Data Store 102. The Application Gateway 102 may include a communication interface 202 to communicate with Data Providers 106, 120; the Key Store 124; the Data Store 122 and the Application Server 104. The Application Gateway 102 may also include a secure storage device 208 that includes a Hardware Storage Module 218 (e.g., storing one or more Group Keys). The advantage of storing keys and certificates in an HSM 218 is the keys reside in a more secure location preventing them from being download.

A memory device 204 may represent one or more non-transient computer-readable, machine-readable, and/or processor-readable devices for storing programming, such as processor executable code or instructions (e.g., software, firmware), electronic data, databases, or other digital information. The storage medium 204 may also be used for storing data that is manipulated by the processing circuit 210 when executing programming. The memory device 204 may be any available media that can be accessed by a general purpose or special purpose processor, including portable or fixed storage devices, optical storage devices, and various other mediums capable of storing, containing or carrying programming.

The memory device 204 may be coupled to the processing circuit 210 such that the processing circuit 210 can read information from, and write information to, the storage medium 204. That is, the storage medium 204 can be coupled to the processing circuit 210 so that the storage medium 204 is at least accessible by the processing circuit 210, including examples where at least one storage medium is integral to the processing circuit 210 and/or examples where at least one storage medium is separate from the processing circuit 210 (e.g., resident in the Application Gateway 102, external to the Application Gateway 102, distributed across multiple entities, etc.).

Programming stored by the memory device 204, when executed by the processing circuit 210, causes the processing circuit 210 to perform one or more of the various functions and/or process operations described herein. For example, the storage medium 204 may include operations configured for regulating operations at one or more hardware blocks of the processing circuit 210, as well as to utilize the communication interface 202 for communication utilizing their respective communication protocols.

The processing circuit 210 is generally adapted for processing, including the execution of such programming stored on the memory device 204. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 210 may be arranged to obtain, process and/or send data, control data access and storage, issue commands, and control other desired operations. The processing circuit 210 may include circuitry constructed, adapted, and/or configured to implement desired programming provided by appropriate media in at least one example. For example, the processing circuit 210 may be implemented as one or more processors, one or more controllers, and/or other structure constructed, adapted, and/or configured to execute executable programming. Examples of the processing circuit 210 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 210 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 210 are for illustration and other suitable configurations within the scope of the disclosure are contemplated.

According to at least one example of the processing circuit 210 may include one or more of a circuit/module for communicating 220, a circuit/module for identifying 222, a circuit/module for applying policies 224, a circuit/module for encrypting 226, a circuit/module for decrypting 228, or a circuit/module for authenticating 629.

As mentioned above, programming stored by the memory device 204, when executed by the processing circuit 210 and communicating with the memory device 204 through a bus 240, causes the processing circuit 210 to perform one or more of the various functions and/or process operations described herein. For example, the memory device 204 may include one or more of the code for communicating 230, the code for identifying 232, the code for applying policies 234, the code for encrypting 236, the code for decrypting 238, or the code for authenticating 239.

The Application Gateway 102 may include more processing circuits 210 in the processing system that may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The software may reside on computer-readable or processor-readable medium of the memory device 204. Processor-readable medium of memory device 204 may be a non-transitory processor-readable medium. A non-transitory processor-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a computer. The terms "machine-readable medium", "computer-readable medium", and/or "processor-readable medium" may include, but are not limited to non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processing circuits, machines and/or devices. The processor-readable medium may also include, by way of example, a carrier wave, a transmission line, and any other suitable medium for transmitting software and/or instructions that may be accessed and read by a computer. Processor-readable medium of the HSM 218 may reside in the Application Gateway 102 system, external to the Application Gateway 102, or distributed across multiple entities including 102. Processor-readable medium of memory device 204 may be embodied in a computer program product. By way of example, a computer program product may include a processor-readable medium in packaging materials. Those skilled in the art will recognize how best to implement the described functionality presented throughout this disclosure depending on the particular application and the overall design constraints imposed on the overall system.

One or more of the components, steps, features, and/or functions illustrated in the figures may be rearranged and/or combined into a single component, step, feature or function or embodied in several components, steps, or functions. Additional elements, components, steps, and/or functions may also be added without departing from the aspects and features described. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessor, but in the alternative, the processing circuit may be any conventional processor, controller, microcontroller, or state machine. A processing circuit may also be implemented as a combination of computing components, e.g., a combination of a DSP and a microprocessor, a number of microprocessors, one or more microprocessors in conjunction with a DSP core, or any other such configuration.

Hence, in one aspect of the disclosure, processing circuit 210 illustrated in FIG. 2 may be a specialized processing circuit (e.g., an ASIC) that is specifically designed and/or hard-wired to perform the algorithms, methods, and/or steps described below. Thus, such a specialized processing circuit (e.g., ASIC) may be one example of a means for executing the algorithms, methods, and/or steps described below. The processor-readable storage medium may store instructions that when executed by a specialized processing circuit (e.g., ASIC) causes the specialized processing circuit to perform the algorithms, methods, and/or steps described herein.

Exemplary Encryption Procedures

Figure 3:
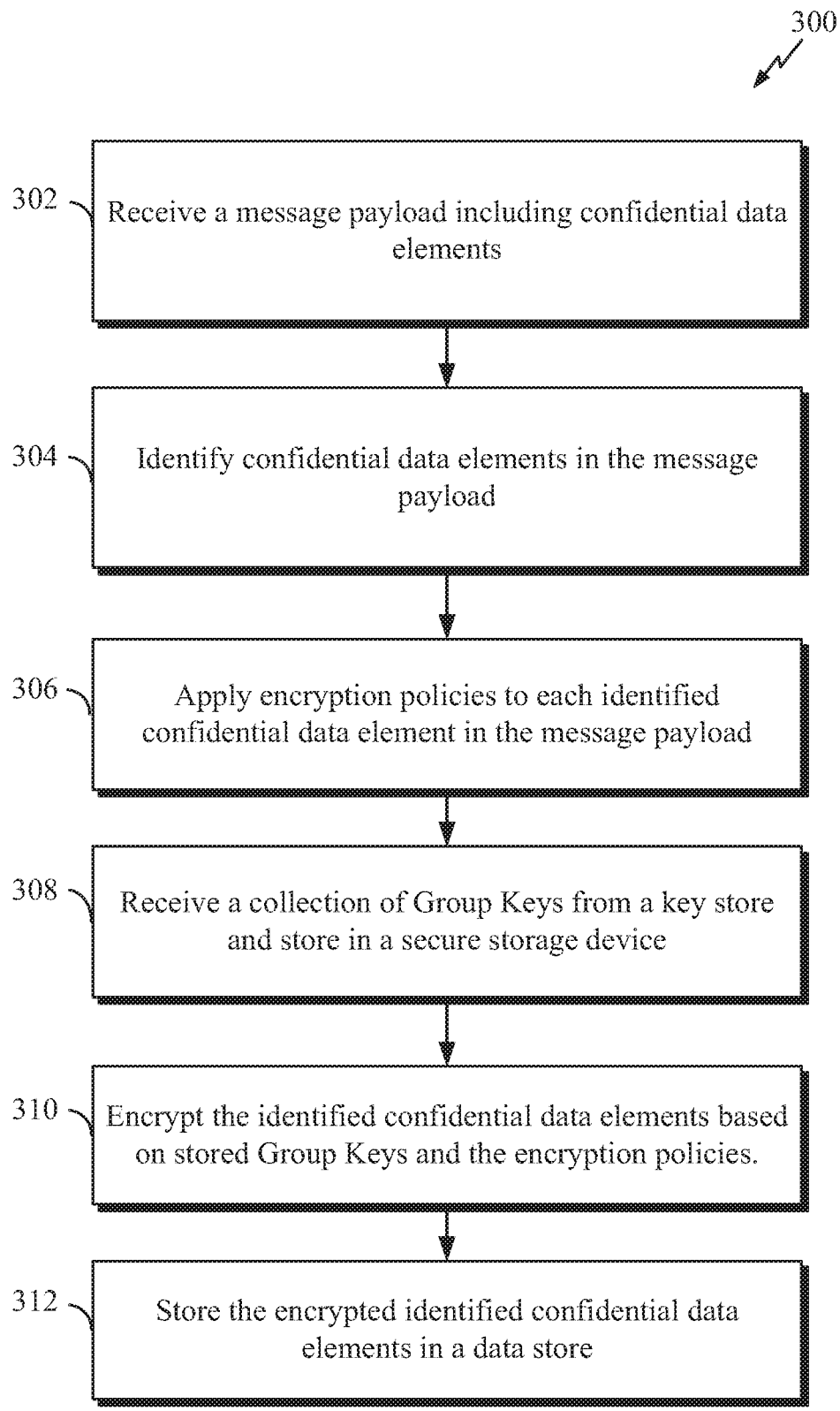
FIG. 3 illustrates an exemplary encryption flow chart in accordance with an illustrative embodiment.

FIG. 3 illustrates an exemplary procedure 300 that may be employed by the processing circuit of FIG. 2, or other suitable-equipped devices, systems or processing circuits, for improving data confidentiality by employing selective encryption at the time of ingestion of the data at the Application Gateway 102. At step 302, the Application Gateway 102 receives a message payload that includes confidential data elements to be stored at the Data Store 122 and routed through the Application Gateway 102 either from an end user at User Data Provider 120 or imported from System Data Provider 106. At step 304, the system of Application Gateway 102 identifies the confidential data elements in the message payload. The confidential data elements may include names, addresses, social security numbers, salary, spousal information, medical data, product design information and other data that is deemed sensitive or confidential. At step 306, the processing circuit 210 of Application Gateway 102 applies encryption policies to each identified confidential data element in the received message payload. The encryption policies are pre-determined and are stored in the HSM 218 for processing by processing circuit 210 to apply the encryption policies to the identified confidential data.

At step 308, the Application Gateway 102 receives a collection of Group Keys stored in a memory in the Key Store 124. The Key Store 124 may be remotely located as shown in the exemplary embodiment of FIG. 1 and accessed through the communication interface 202 or may be located on the Application Gateway 102 as shown in the exemplary embodiment of FIG. 2. The Group Keys received may be stored in the HSM 218. Group Keys may be, for example, cryptographically symmetric keys. The potential consumer of the data determines which Group Key is used to encrypt what part of the data. That is, a first confidential data element may be encrypted using a first Group Key and a second confidential data element may be encrypted using a second Group Key. For example, PII data elements of employees in an organization may be encrypted by an HR Group Key, and financial and competitive product data may be encrypted by a Product Manager Group Key. Different groups of users participating in the same business process can be configured to access different segments of one business object. For example, in a background investigation scenario, a Group of investigators checking the employment history are provided permission to access to the employment data, whereas another group of medical investigators are allowed access to the PHI data. This is implemented by creating separate Group Keys for Employment Investigators and Health Investigators. To further illustrate the concept Table 1 below shows an example of data elements and Groups that may be permitted access to the encrypted data elements.

TABLE 1

| Data Element | Group |
| --- | --- |
| SSN | HR |
| Full Home Address | HR |
| Spousal Information | HR |
| Salary | Payroll |
| Product Design Parameters | Product Mangers |

At step 310, the processing circuit 210 encrypts the identified confidential data elements based on the Group Keys and the encryption policies. Thus, the processing circuit 210 of the Application Gateway 102 may encrypt various confidential data elements in the incoming message payload using different Group Keys following the encryption policies configured in the Application Gateway 102 as discussed in the examples above. That is, different confidential data elements may be encrypted differently based on the Groups Keys and the encryption policies available to the Application Gateway 102.

At step 312, the processing circuit 210 of the Application Gateway 102 stores the encrypted data and any non-encrypted data from the message payload in the Data Store 122.

Exemplary Data Retrieval and Decryption Procedures

Figure 4:
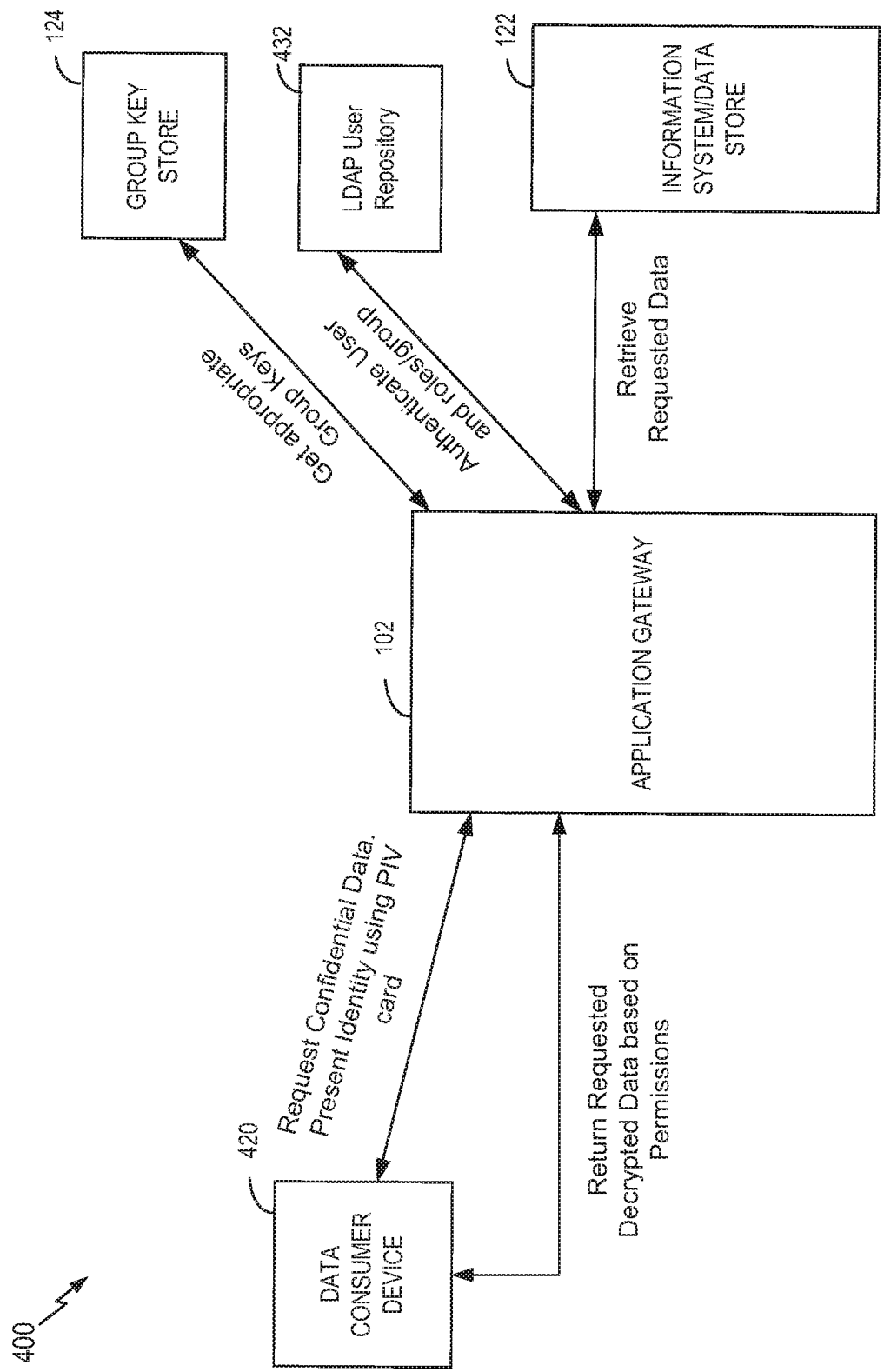
FIG. 4 provides a block diagram of an Application Gateway decryption process in accordance with an illustrative example.

FIG. 4 illustrates a system 400 of exemplary components in accordance with one example where various novel features of a decryption procedure described below may be exploited. The system 400 includes many of the same components discussed above related to the encryption process where the Application Gateway 102 now resides between the Data Store 122 containing the encrypted confidential data elements and non-encrypted data and includes a Data Consumer at Data Consumer device 420 which now requests access to the encrypted data provided by Data Providers 120, 106 discussed above. The encrypted confidential data elements may now be decrypted for the Data Consumer depending on the role parameters and permissions discussed below. The decryption procedures described may be implemented by, for example, the architectural structure discussed above in association with FIG. 2. For example, the processing circuit 210, as utilized in the Application Gateway 102, may be used to implement any one or more of the processes described discussed below. In particular, processing circuit 210 may be configured to: receive a request from a data consumer for confidential data stored in the Information System Data Store; identify the roles, permissions and/or group affiliation of the user or data consumer; retrieve the Group Keys based on the role membership and/or group affiliation of the user; retrieve the requested data from the Data Store; decrypt the encrypted elements applying the Group Keys and the encryption policies to each identified confidential data element in the message payload and present the decrypted data to the data consumer. The Application Gateway 102 may include a communication interface 202 to communicate with Data Consumer device 420; the Key Store 124; the Data Store 122 and the User Repository 432.

Communications requesting confidential data from the Data Store 122 are routed through the Application Gateway 102 to implement selective decryption of confidential data as will be further explained in accordance with embodiments presented herein.

The Application Gateway 102 receives a request from Data Consumer device 420 for confidential data stored in the Information System Data Store 122. The Application Gateway 102 authenticates an identity of the Data Consumer based on a login authentication as are known in the art. For example, the Data Consumer may use a X.509 compliant digital certificate to authenticate with the Application Gateway 102 that the user has permission to access confidential data on the Information System Data Store 122. The digital certificate may be presented, for example in use with a Personal Identification Verification (PIV) card, which is commonly used as a United States federal smart card but may also be used by non-federal agencies, that contains the necessary data for the cardholder to be granted access to information systems and assure appropriate levels of security for all applicable applications. The PIV card acts to enforce 2-factor authentication where the user is required to provide a Personal Identification Number (PIN), in addition to presenting the digital certificate to access data on the Information System Data Store 122. In an exemplary embodiment, the user authentication process may include a Public Key Infrastructure (PKI) and asymmetric keys (combination of public key and private key) used to validate a user's credentials and to authenticate the user at Data Consumer device 120. A data consumer at Data Consumer device 120 may log into the system 400 using the PIV key, which includes presenting their X.509 certificate to authenticate and establish a TLS session with the Information System Data Store 122 and through the Application Gateway 102. Once successfully authenticated, the user's identity may be used to determine his/her role and/or Group affiliation. The Group affiliation may be accomplished by processing circuit 210 of the Application Gateway 102 accessing a User Repository 432 through the communication interface 202 and identifying the user's role from information in the User Repository 432 and based on the authenticated login identity. The Application Gateway 102 receives from the User Repository 432 a user role or Group affiliation based on the authenticated identity. The User Repository 432 may be, for example, a Lightweight Directory Access Protocol (LDAP) directory. The processing circuit 210 on the Application Gateway 102, then requests a collection of Group Keys from the Key Store 124 through the communication interface 202. The Application Gateway 102 receives the Group Keys appropriate for the user role and/or Group affiliation received from the User Repository 432. That is, when a data consumer at Data Consumer device 420 requests data from the Data Store 122, a user is granted access through the Application Gateway 102 to one or more Group Keys from Group Key Store 124, based on a user's role and Group affiliation that are required to decrypt the data requested by the user. This entire decryption process is transparent to the user as the Application Gateway 102 implements the decryption process as a part of a Single Sign On (SSO) workflow. All user requests are routed through the Application Gateway 102, and the policies pre-configured in the Application Gateway 102 provide the criteria for the novel processes discussed herein to decide if the user has the appropriate role required to access the encrypted data.

To assist with the SSO workflow, the Application Gateway 102 may provide or integrate with an Identity Provider (IdP), also known as Identity Assertion Provider that authenticates users using security tokens like SAML 2.0. The IdP analyzes identities of users and creates SAML token which are used for accessing data from the Information Systems Data Store 122 participating in the process.

Based on the Group Keys received, the Application Gateway 102 requests the data from the Information System Data Store 122 and the Application Gateway 102 receives a message in response which includes encrypted elements. The processing circuit 210 on the Application Gateway 102 applies the Group Keys received to the encrypted confidential data elements and decrypts the encrypted data elements based on the Group Keys received.

The Application Gateway 102 communicates with the Data Consumer device 420 and presents the decrypted data to the data consumer.

Figure 5:
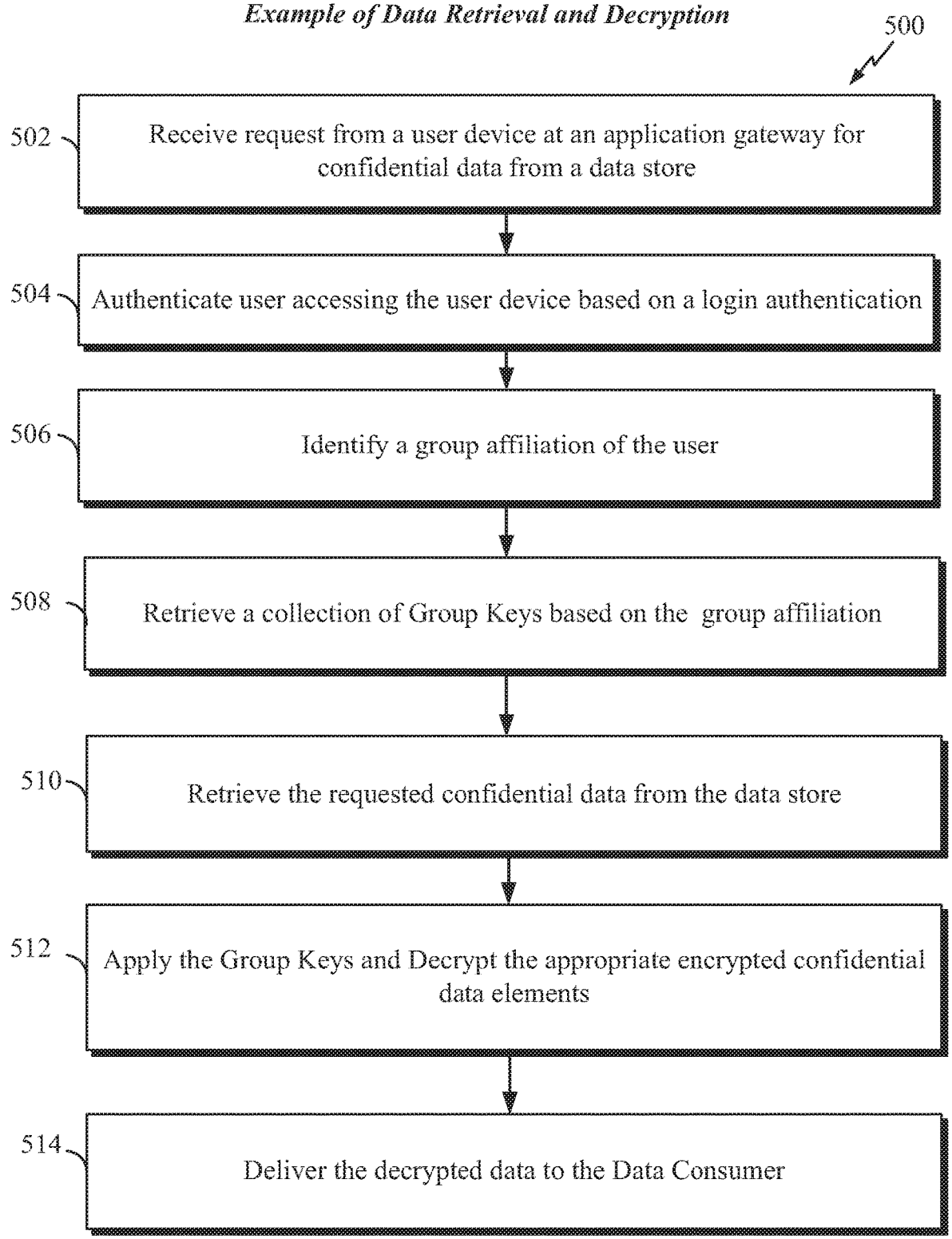
FIG. 5 is a block diagram illustrating an exemplary decryption flow chart in accordance with an illustrative embodiment.

FIG. 5 illustrates an exemplary procedure 500 that may be employed by the processing circuit of FIG. 2 in the system of FIG. 4, or other suitable-equipped devices, systems or processing circuits, for improving data confidentiality by employing selective decryption at the Application Gateway 102 of the stored encrypted confidential data. At step 502, the Application Gateway 102 receives a request from Data Consumer device 420 for confidential data stored in the Information System Data Store 122. At step 504, the system of Application Gateway 102 authenticates an identity of the Data Consumer based on a login authentication as are known in the art and discussed in more detail above. At step 506, the processing circuit 210 of Application Gateway 102 accesses a User Repository 432 through the communication interface 202 identifies the user's role from information in the User Repository 432 and based on the authenticated login identity. The Application Gateway 102 receives from the User Repository 432 the user's role and/or Group affiliation based on the authenticated identity.

At step 508, the Application Gateway 102 requests a collection of Group Keys from the Key Store 124. The Application Gateway 102 receives a collection of Group Keys that are appropriate for the user role and/or Group affiliation received from the User Repository 432.

At step 510, based on the Group Keys received, the Application Gateway 102 requests the data from the Information System Data Store 122 and the Application Gateway 102 receives a message in response which includes encrypted elements.

At step 512, the processing circuit 210 on the Application Gateway 102 applies the Group Keys received to the encrypted confidential data elements and decrypts the encrypted data elements based on the Group Keys received. That is, for example, a first confidential data element may be decrypted using a first Group Key and a second confidential data element may be decrypted using a second Group Key.

At step 514, the Application Gateway 102, through the communication interface 202, delivers the decrypted data to the Data Consumer at the Data Consumer device 420.

Resulting Aspects of the Invention

Due to the above discussed aspects of the invention malicious attacks, in particular, insider attacks can be prevented. If a malicious user tries to export the data from the data store the data remains encrypted and useless to the malicious user who lacks access to the Group Keys to decrypt the data so no confidential data is breached. Thus, it successfully prevents confidential data exfiltration. In addition, because of the various role and group affiliation that determines the encryption and decryption policies, and identity of users is established by PIV key which is in turn used to decide their group membership, even an insider without proper access rights would not be able to have access to each confidential data element. If the Database Administrators or System Administrators are not members of a functional group authorized to view and edit data, they will not have the ability to decrypt confidential data stored in the database. Thus, the present invention affects the operation of access through the Application Gateway and its respective hardware components by providing selective access to the data and preventing malicious data access and malicious data exfiltration. Therefore, the present invention provides an improved system and method over the prior art which often simply offer alerts after such incidents occur.

The present invention uses the identity of the user to look up their role and group membership and the data consumption request to dynamically retrieve the appropriate Group keys using policies configured in the Application Gateway making it a robust system for preventing malicious attacks. Moreover, the present invention uses a model that absolves network package monitoring or data usage pattern of different users as this model uses cryptography to store and exchange data securely.

The system keeps the data encrypted at the source and only makes it available to the data consumer as and when requested. Thus, the above described system and methods can be used over a public network. As the data exchange happens through a secure channel using TLS and the confidential data inside the channel remains encrypted, it provides two levels of data security.

Exemplary System or Apparatus

One or more processing circuits 210 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One or more of the components, steps, features, and/or functions illustrated in the figures may be rearranged and/or combined into a single component, step, feature or function or embodied in several components, steps, or functions. Additional elements, components, steps, and/or functions may also be added without departing from the aspects and features described. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessor, but in the alternative, the processing circuit may be any conventional processor, controller, microcontroller, or state machine. A processing circuit may also be implemented as a combination of computing components, e.g., a combination of a DSP and a microprocessor, a number of microprocessors, one or more microprocessors in conjunction with a DSP core, or any other such configuration.

Also, it is noted that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

It is contemplated that various features described herein may be implemented in different systems. It should be noted that the foregoing aspects of the disclosure are merely examples and are not to be construed as limiting. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A system for data protection comprising:
   a gateway, the gateway including;
   a communication interface configured to receive and send encrypted and non-encrypted data;
   a secure storage device configured to store a plurality of pre-configured encryption policies;
   a processing circuit coupled to the secure storage device and the communication interface, the processing circuit configured to:
   identify confidential data elements in a message payload received at the gateway through the communication interface;
   apply the encryption policies to each identified confidential data element in the message payload;
   receive a collection of group keys from a key store and store the group keys in the secure storage device;
   encrypt each identified confidential data element in the message payload based on the encryption policies and the group keys; and
   store the encrypted identified confidential data elements in a remotely located data storage device accessible through the communication interface, wherein the processing circuit is configured to encrypt a first confidential data element using a first group key and a second data element using a second group key.

2. The system of claim 1, wherein the confidential data elements are encrypted at a moment of ingestion at the data storage device.

3. The system of claim 2, wherein the confidential data elements remain encrypted at the data storage device.

4. The system of claim 1, wherein the message payload received at the gateway originates from a user data provider.

5. The system of claim 1, wherein the message payload received at the gateway originates from a system data provider.

6. The system of claim 1, wherein the remotely located data storage device is an information system data store.

7. The system of claim 1, wherein the confidential data elements include personal information, financial information or business information.

8. A method implemented at a gateway for data protection comprising:
   identifying confidential data elements in a message payload received at the gateway;
   applying a collection of encryption policies stored on the gateway to each identified confidential data element in the message payload;
   receiving a collection of group keys related to group affiliations of users from a key store and storing the group keys in a secure storage device;
   encrypting each identified confidential data element in the message payload based on the encryption policies and the group keys; and
   storing the encrypted identified confidential data elements in a remotely located data storage device accessible through the gateway, wherein encrypting each identified confidential data element includes encrypting a first confidential data element using a first group key and a second data element using a second group key.

9. The method of claim 8, wherein the confidential data elements are encrypted at a moment of ingestion at the data storage device.

10. The method of claim 9, wherein the confidential data elements remain encrypted at the data storage device.

11. The method of claim 8, wherein the message payload received at the gateway originates from a user data provider.

12. The method of claim 8, wherein the message payload received at the gateway originates from a system data provider.

13. The method of claim 8, wherein the confidential data elements include personal information, financial information or business information.

14. A method implemented at a gateway for decrypting protected data comprising:
   receiving a request from a user device at the gateway for confidential data from a data storage device in communication with the gateway;
   authenticating a user accessing the user device based on a login authentication of the user;
   identifying a group affiliation based on the login authentication of the user;
   retrieving a collection of group keys based on the group affiliation;
   retrieving the confidential data including encrypted confidential data elements from the data storage device;
   decrypting the encrypted confidential data elements based on the group keys; and
   delivering the confidential data including the decrypted confidential data elements to the user device, wherein decrypting the encrypted confidential data elements includes decrypting a first confidential data element using a first group key and a second data element using a second group key.

15. The method of claim 14, wherein the request is received at the gateway is over a secure Transport Layer Security (TLS) session.

16. The method of claim 14, wherein the login authentication includes a X.509 certificate.

17. The method of claim 14, wherein the confidential data elements are not saved as decrypted confidential elements on the data storage device.

* * * * *